A. W. SCHRAMM.
VALVE.
APPLICATION FILED FEB. 4, 1914.

1,163,471. Patented Dec. 7, 1915.

Witnesses
Walter Chism
Will A. Burrows

Inventor
Adolph W. Schramm
by his Attorneys
Howson & Howson

UNITED STATES PATENT OFFICE.

ADOLPH W. SCHRAMM, OF RIVERTON, NEW JERSEY, ASSIGNOR TO ELECTRO DENTAL MANUFACTURING COMPANY, OF PHILADELPHIA, PENNSYLVANIA, A CORPORATION OF PENNSYLVANIA.

VALVE.

1,163,471.

Specification of Letters Patent. Patented Dec. 7, 1915.

Application filed February 4, 1914. Serial No. 816,637.

*To all whom it may concern:*

Be it known that I, ADOLPH W. SCHRAMM, a citizen of the United States, residing in Riverton, Burlington county, New Jersey, have invented certain Improvements in Valves, of which the following is a specification.

One object of my invention is to provide a relatively simple, inexpensive and substantial valve, particularly designed for use in connection with atomizers, which shall have its parts so arranged that the likelihood of their getting out of order or requiring frequent attention or repair shall be reduced to a minimum.

I further desire to provide a valve having the above characteristics which shall include novel means for controlling the flow of air through its body, and which shall also include a novel arrangement of parts for quickly permitting the escape of compressed air from the vaporizer after the flow of air thereto shall have been cut off.

Figure 1:
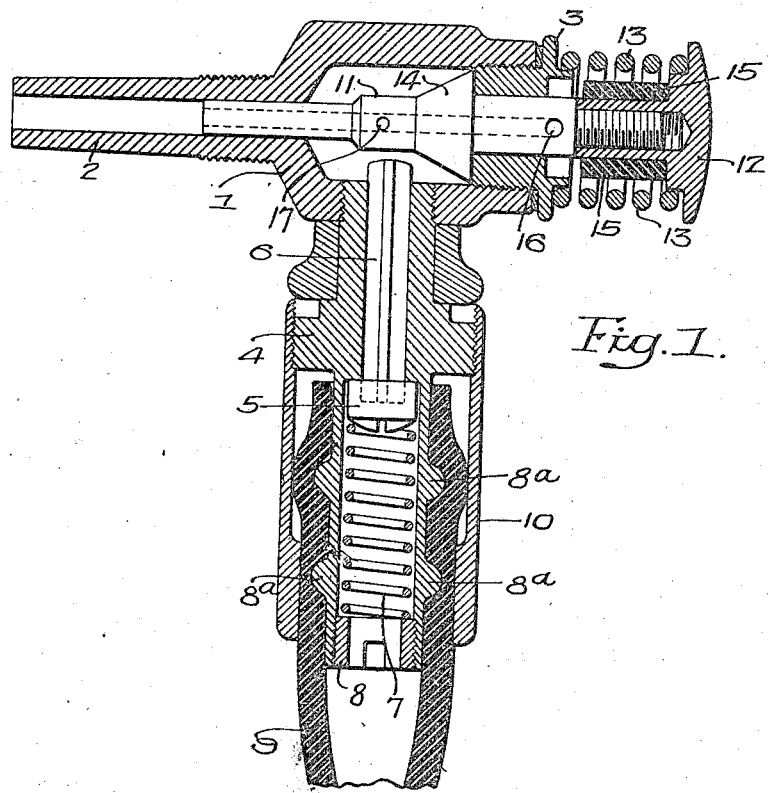
Figure 2:
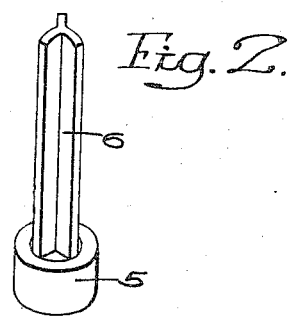

These objects and other advantageous ends I secure in the following manner, reference being had to the accompanying drawings, in which, Figure 1 is a vertical section of a valve constructed in accordance with my invention, and Fig. 2 is a perspective view of the valve proper forming part of the invention.

In the above drawings, 1 represents a hollow body or casing having at one end a tubular, externally tapering nozzle 2 designed for removable insertion in a suitably formed passage in the cap or cover of a vaporizer, and provided at its opposite end with a threaded opening for the reception of a cap 3. A hose connection 4 in the form of an elongated tube, is threaded into one side of the body 1 and has within it two portions of different diameters separated by a shoulder forming a seat for a valve 5 attached to a vaned stem 6 guided in the small diameter bore of said hose connection. The large diameter chamber of this latter contains a spring 7 whereby the valve 5 is normally held to its seat and this spring is held in place by a tubular plug 8 secured in the end of the connection. Externally this member 4 is provided with annular ribs 8ª for the retention of a rubber hose 9 and has secured upon its main portion a protecting ferrule 10 which extends over the end portion of the hose.

Within the hollow of the body 1 is mounted a plunger 11 longitudinally movable in a line at right angles to the line of movement of the valve and made tubular for a greater part of its length. A head 12 is secured on one end of this plunger and a spring 13 is confined between this and the cap 3. About midway of its length the plunger has a conical portion 14 and that part between its head and said portion is guided by the cap 3, while its opposite end is slidably guided in the tubular passage of the nozzle 2. A portion of the head 12 is made of substantially the same diameter as that part of the plunger guided in the cap 3 and carries a soft rubber collar 15 which under certain conditions coöperates with the head and with the adjacent end of the cap 3 to serve as a valve for preventing leakage of air from the hollow interior of the plunger through a hole 16. A second hole 17 opens into the passage of the plunger to permit of the flow of air into the same and to the nozzle from the hollow interior of the body 1.

Under conditions of use, if the nozzle 2 should be applied to a vaporizer or other device to which it is desired to deliver air under pressure, and the hose 9 be connected to a source of such air, obviously all flow from said source is prevented by the valve 5 which is kept seated by the spring 7, as well as by the pressure of air in the rubber hose 9; the end of the stem 6 of said valve extending into the hollow chamber within the main part of the body 1. The spring likewise acts on the head 12 to hold the enlarged part of the plunger in engagement with the inner face of the cap 3.

When it is desired to deliver air under pressure to the apparatus attached to the nozzle, the head 12 is pressed inwardly, thus first cutting off direct communication to the atmosphere through the passage 16 and shortly thereafter causing the rubber collar 15 to make air tight connection with the adjacent portions of the cap 3 and said head so as to effectually prevent escape of air from the chamber of the body 1 through the opening 17, the passage within the plunger and the outlet opening 16.

The continued inward movement of the plunger by reason of the pressure on the head 12 finally brings the conical part 14 into engagement with the end of the valve stem 6 and so acts on this latter as to raise the valve 5 off its seat against the action of the spring 7. Air under pressure is now free to flow from the rubber hose 9 through the plug 8 past the valve 5, through the hose connector 4 into the hollow of the casing 1, thence through the hole 17 the hollow interior of the plunger structure and the nozzle 2 to whatever apparatus is supplied therefrom.

When it is desired to cut off the flow of air, the pressure on the head 12 is released, whereupon the conical part 14 of the plunger disengages the stem 6 and permits the valve to seat itself under the action of the spring 7; thus preventing further flow of air. The continued movement of the plunger under the action of the spring 13 next permits the collar or tubular rubber valve 15 to move away from the end of the cap 3 and very shortly thereafter permits the hole 16 to again set up communication between the chamber of the body 1, the interior of the apparatus connected to the nozzle and the atmosphere. The compressed air in said apparatus and in the valve structure is thus instantaneously relieved so that the flow from the discharge nozzle of the vaporizer or other apparatus is caused to instantly cease when the valve closes, instead of gradually diminishing with waste and spluttering of drops of liquid from said apparatus.

From the above description it will be noted that the interior of the casing 1 and of the apparatus to which my valve structure is attached, are cut off from communication with the atmosphere just prior to the admission to them of air under pressure, and that immediately after the supply of air has been shut off, the air under pressure still remaining in the apparatus and in the valve structure is at once relieved.

I claim:—

1. The combination of a casing having an outlet and an inlet; a normally seated valve for the inlet; a manually operative plunger in the form of a tube normally opening outside the casing and movable in a line substantially at right angles to the line of movement of the valve, for opening the latter at will; with a second valve mounted on the plunger outside the casing normally in open position and adapted to close communication between the tube and the outside of the casing and to release pressure in the outlet after the first valve is closed.

2. The combination of a casing; a normally seated valve therein; and a manually operative plunger having a passage for relieving the pressure in the casing and movable in a line substantially at right angles to the line of movement of the valve, for opening the latter at will; with means for closing communication between the relief passage and the atmosphere under predetermined conditions.

3. The combination of a casing; a normally seated valve therein; a manually operative plunger having a passage for releasing the pressure in the casing and movable in a line substantially at right angles to the line of movement of the valve, for opening the latter at will; and means for closing communication between the relief passage of the plunger and the atmosphere before the valve is opened.

4. The combination of a casing connected to a source of air under pressure; a main valve for controlling the flow of air to the casing; a tubular plunger mounted to engage and operate the valve and having a relief opening leading to the outside of the casing; and a valve operable by the plunger for closing communication between the relief opening thereof and the atmosphere before the main valve can be opened.

5. The combination of a hollow casing having an inlet and an outlet; a valve normally closing the inlet; a plunger for opening the valve, having a passage with branches respectively opening into the outlet, the interior of the casing and outside said casing for releasing the pressure from the outlet; and means for closing communication between the relief passage and the atmosphere before the valve is opened.

6. The combination of a hollow casing having an outlet; a valve for controlling the flow of air under pressure to said casing; a plunger operative at an angle to the line of movement of the valve to open the same, said plunger having a passage including branches opening into the outlet, the casing and also to the atmosphere; and means for closing communication between the last of said branches and the atmosphere prior to the opening of the valve.

7. The combination of a casing having an inlet and an outlet; a normally seated valve controlling the flow of air through the inlet; a tubular plunger movable at right angles to the line of movement of the valve for opening the same, there being a passage in the plunger having branches opening into the outlet, the casing, and into the atmosphere; with means for closing communication between the last of said branches of the plunger passage and the atmosphere before the valve is opened.

8. The combination of a casing; a tubular plunger therein having an opening leading from the casing to a point normally outside said casing; a tubular valve on the plunger mounted to close communication between said opening and the atmosphere after said plunger has moved a predetermined distance; and a normally closed admission valve operative by movement of the plunger after said tubular valve has been moved to a closed position.

9. The combination of a hollow casing; a tubular plunger in the casing having a head outside the same and provided with an opening leading from the interior of the casing to the atmosphere; a tubular valve on the plunger between the head and the casing; and an admission valve having a stem projecting into position to be operatively engaged by the plunger after the tubular valve has closed communication between said opening and the atmosphere.

10. The combination of a hollow casing having a valve seated inlet and an outlet; a spring pressed valve coöperating with the seat in the inlet; a plunger guided in the outlet and having an inclined portion operative to unseat the valve when said plunger is moved in the casing; there being a passage in the plunger having openings into the outlet, the casing and also to the atmosphere; a spring normally holding the plunger with its latter opening in communication with the atmosphere; and means carried by the plunger for closing communication between said latter opening and the atmosphere when the plunger is moved to unseat the valve.

11. The combination of a hollow casing having two communicating passages at right angles to each other; a valve normally seated in one of the passages; a plunger operative in the other passage and having an inclined portion for engaging the valve to unseat the same; there being a passage extending through the plunger to a point thereof normally outside the casing; a head for the plunger; a tubular rubber valve on the plunger between the head and the casing; and a spring normally holding the plunger in a position with its passage open to the atmosphere.

In testimony whereof, I have signed my name to this specification, in the presence of two subscribing witnesses.

ADOLPH W. SCHRAMM.

Witnesses:
 WILLIAM E. BRADLEY,
 WM. A. BARR.